United States Patent [19]

Redding

[11] Patent Number: 5,243,809
[45] Date of Patent: Sep. 14, 1993

[54] LEAF AND LAWN DEBRIS HIGH-EFFICIENCY DISPOSABLE BAG WITH SUPPORT

[76] Inventor: Rodney Redding, 2548 Mountain Shadow La., Laramie, Wyo. 82070

[21] Appl. No.: 916,782

[22] Filed: Jul. 17, 1992

[51] Int. Cl.⁵ ........................................... A01D 34/70
[52] U.S. Cl. ........................................ 56/202; 55/364; 55/378; 55/381
[58] Field of Search .............. 56/202; 55/364, 378, 55/380, 381

[56] References Cited

U.S. PATENT DOCUMENTS

| | | |
|---|---|---|
| 3,257,788 | 6/1966 | Pirie ............................ 56/202 |
| 3,574,272 | 4/1971 | Krewson ..................... 56/202 |
| 3,874,152 | 4/1975 | Dahl . |
| 3,881,304 | 5/1975 | Lempke . |
| 3,995,414 | 12/1976 | Kerr et al. . |
| 4,186,546 | 2/1980 | Machado et al. . |
| 4,377,063 | 3/1983 | Leaphart . |
| 4,393,645 | 7/1983 | Moore . |
| 4,470,246 | 9/1984 | Donegan . |
| 4,503,661 | 3/1985 | Potter . |
| 4,747,259 | 5/1988 | Kline et al. . |
| 4,791,779 | 12/1988 | Hoffman . |
| 4,897,988 | 2/1990 | Schweitz et al. . |
| 4,969,320 | 11/1990 | Langford . |
| 4,989,400 | 2/1991 | Wark ............................ 56/202 |

*Primary Examiner*—Charles Hart

[57] ABSTRACT

Apparatus for containing leaf and lawn debris as an accessory to a power mower comprising a bag made from plastic film and plastic mesh with coupled seals, means for expelling air from said bag as it fills with the debris, an attached enclosure made from large mesh material, means for placing bag into enclosure, and means for sealing the filled bag.

17 Claims, 3 Drawing Sheets

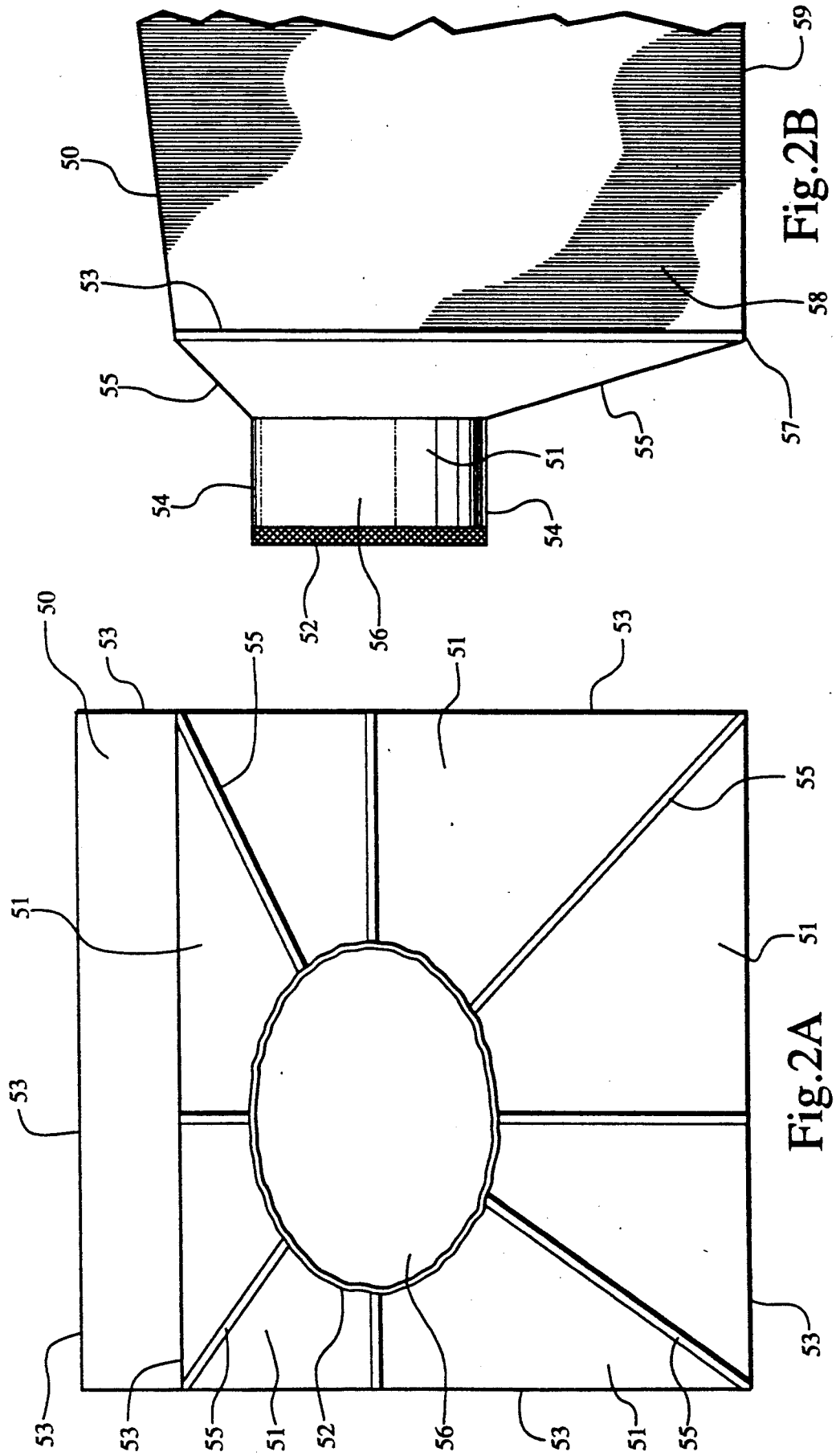

LEAF AND LAWN DEBRIS HIGH-EFFICIENCY DISPOSABLE BAG WITH SUPPORT

BACKGROUND OF INVENTION

1. Field of Invention

The present invention relates to a deposable bag design for leaf and lawn debris for attachment to a small power mower.

2. Background

Lawn mower users have several choices as to their disposal of cut grass or other lawn debris. They avoid the use of a bagger and leave such material on the lawn. Conversely certain mower designs retain the grass clippings and further mulch them before depositing them on the cut grass surface; however, lawn build-up over time becomes a problem. Many persons prefer to catch the grass clippings by employing a bagger; however, then said clipping are transferred to a receptacle for further use or disposal. These attachments require frequent emptying of the bag resulting in a time consuming, inefficient process. Yet even if a disposable bag is employed, the design leaves is inefficient for filling. Another aspect is provision efficient collection when the grass is quite wet; some adjustment is needed in the air supply to move such wet grass.

An important aspect of the disposing of leaf and lawn debris is environmentally acceptability. Normally this implies that any bag employed consists of biodegradable material. Further bag size is such that ease of handling is accomplished routinely by even persons small of statute. Another aspect is safety provisions so that any rocks, missiles, or other solid items picked up by the mower assembly is not allowed to puncture the collection bag and injurer anyone.

The following U.S. patents represent inventions related to the process of collecting leaf and lawn debris:

| No. | Inventor | Year |
| --- | --- | --- |
| 4,969,320 | Langford | 1990 |
| 4,897,988 | Schweitz et al | 1990 |
| 4,791,779 | Hoffman | 1988 |
| 4,747,259 | Kline et al | 1988 |
| 4,503,661 | Potter | 1985 |
| 4,470,246 | Donegan | 1984 |
| 4,393,645 | Moore | 1983 |
| 4,377,063 | Leaphart | 1983 |
| 4,186,546 | Machado et al | 1980 |
| 3,995,414 | Kerr et al | 1976 |
| 3,881,304 | Lempke | 1975 |
| 3,874,152 | Dahl | 1975 |
| 3,574,272 | Krewson | 1971 |

Referring to the above list, Langford discloses a grass level indicator with special cover latching allowing dumping of alternate collection of nondisposable bags designed for lawn tractors. Schweitz et al disclose an L-shaped side grass deflector for rear bagging mowers that allows positioning as such a grass deflector and then swinging away when a bagger is employed. Hoffman discloses a leaf receptacle bag for a vacuum tractor unit designed to fill selectively by employing a diagonal bag using a single centered air outlet.

Kline et al disclose a grass catching assembly employing a closed plastic disposable bag which is missing adequate design for air removal and evenness of bag fill. Potter discloses a bagger employing a pivotal lifting chute between the ground and the bag holder; this system is not hooked to a power mower. Donegan discloses an automatic complex-mechanical lawn clippings bagger that positions stored disposable bags and then moves to an operating location over the discharge chute of the power mover; this unit is missing adequate design for air removal and evenness of bag fill.

Moore discloses a bagger attachment for a lawn tractor employing two vertical bags placed behind the driver connected by a chute to the mower discharge. Leaphart discloses a safety catcher bag housing containing a sparsely perforated disposable bag; this unit is missing adequate design for air removal in order to assure evenness and completeness of bag fill. Machado et al disclose a perforated disposable bag holder for the rear of a power lawn mower using a long duct to fill the vertical positioned bag.

Kerr et al disclose a plastic bag catcher hung from a power mower handle containing a perforated top grid section and expandable side front slits for air removal; this unit is missing adequate design for air removal in order to assure evenness and completeness of bag fill. Lempke discloses a grass catcher using a large nondisposable cloth or woven ballistic material bag for a side-throwing riding mower with a mechanical pivot to position the bag for dumping.

Dahl discloses a disposable perforated bag grass catcher for a rotary mower positioned within a supporting side-hinged fabric carrier bag; this unit is missing adequate design for air removal in order to assure evenness and completeness of bag fill. Krewson discloses a lawn and leaf rake power mower where the catcher is a fabric bag containing an inner perforated disposable plastic bag.

BRIEF DESCRIPTION OF DRAWINGS

FIG. 2A shows front view of preferred bag design.
FIG. 2B shows side view of preferred bag design.

SUMMARY OF INVENTION

It is a purpose of this invention to overcome to deficiencies noted in the aforementioned prior art. This includes an environmentally acceptable mode of disposing of leaf and lawn debris; thus, biodegradable bag material is employed if the holding bag is also disposed. Further bag size is such that ease of handling is accomplished routinely by even persons small of statute. Safety is another important aspect so that any rocks, missiles, or other solid items picked up by the mower assembly is not allowed to puncture the collection system and cause injury to anyone.

A further purpose is to design the collection system for high-efficiency in bag filling, and this requires a design match between the size, shape and air venting of the collection bag and the amount of air produced by the specific power mower employed.

DETAILED DESCRIPTION OF INVENTION

The disposable bag for lawn and leaf debris requires an accompanying holder for practicality and its attributes are described later after the bag's unique properties are explained.

Figure 1:
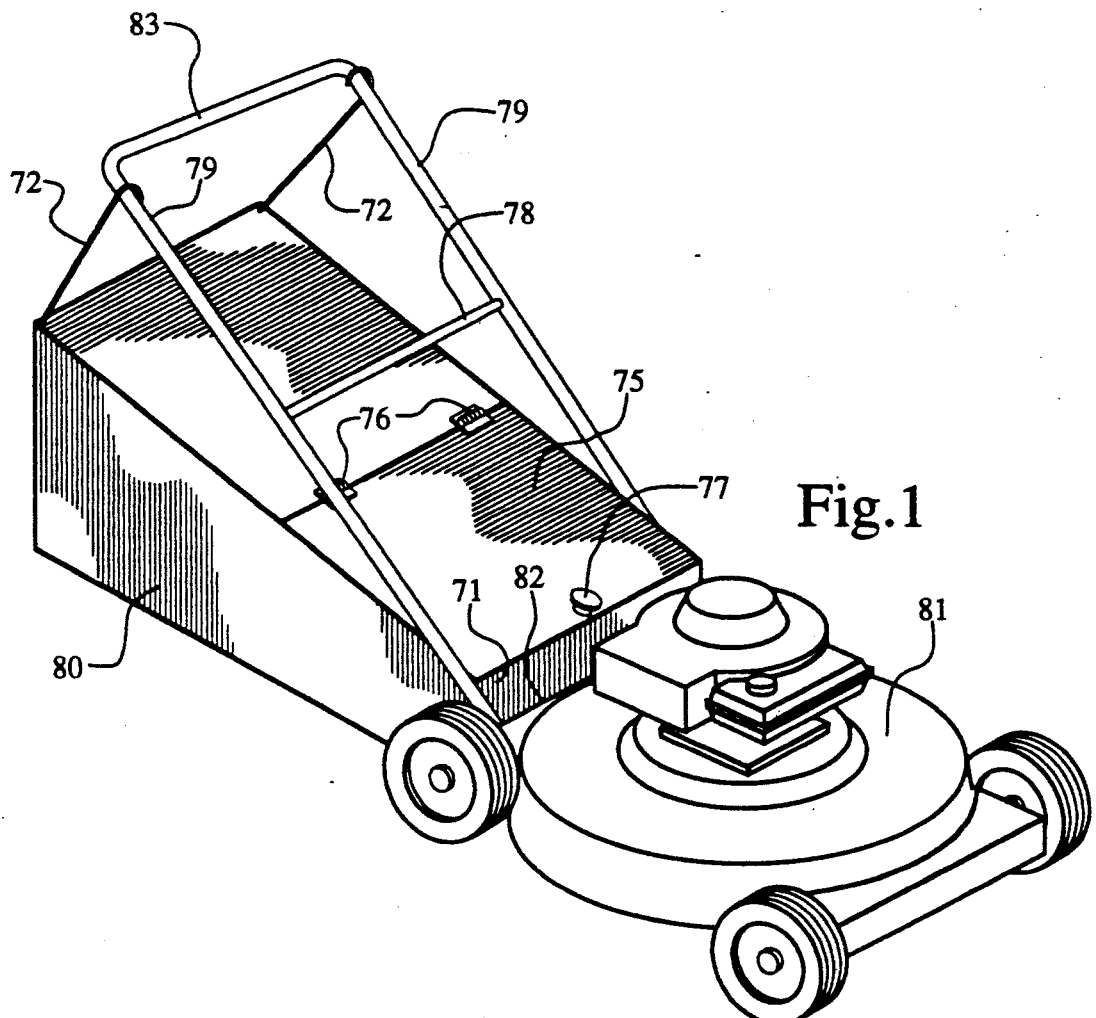
FIG. 1 shows the bag and holder attached to mover.
Figure 4:
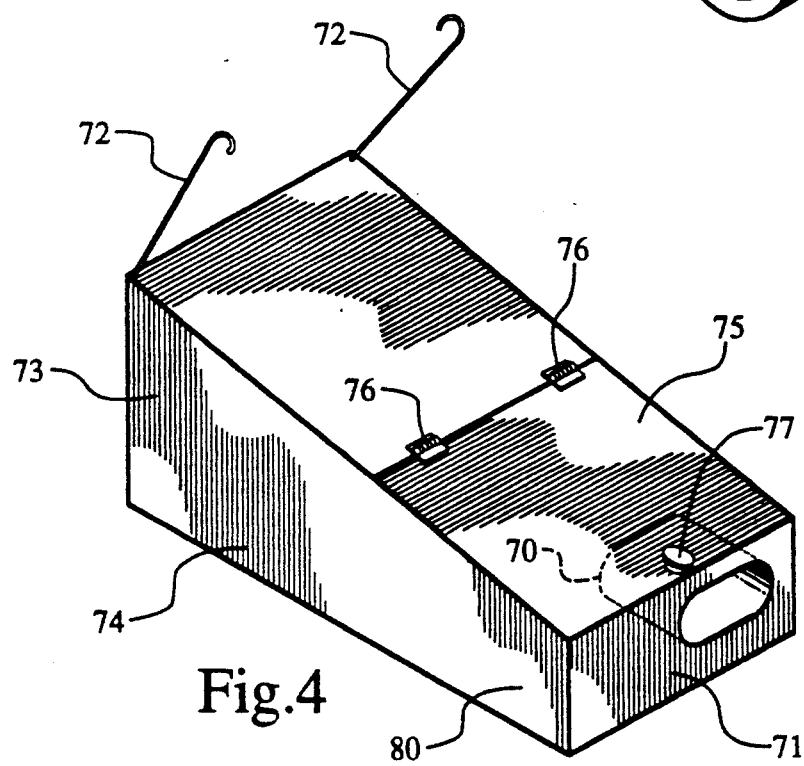
FIG. 4 shows holder design.

FIG. 1 shows the overall bag and holder attached to a typical mower. FIGS. 2A and 2B show the bag in two views. For clarity the enclosing plastic of said bag is defined by looking down onto the top 50; next to the ground as the bottom 59; away from the mower as back 60; toward the mower as front 55; and on either side as sides 58. FIG. 2A is looking directly into the end of the bag showing the oval opening 56 and its attachment to the mower discharge chute extender 70 mounted in the holder as shown in FIG. 4. Said opening is shown expanded to the size necessary to fit over said extender; the elastic band 52 would nearly shut said opening 56 for a non-mounted bag. An elastic band 52 positioned onto the plastic material 51 surrounds said opening 56. The elastic 56 is shown expanded ready to mount in the holder; however, once the bag is filled, this elastic band 56 contracts and holds shut the bag so that the lawn and leaf debris does not fall out. Such elastic band 52 is normally built into neck of the bag, thus being an integral part of the bag as manufactured, by folding the plastic over the band and heat sealing. In an alternate formulation an external band, not necessarily elastic, is potentially employed to position and close the bag.

The opening 56 is shown in a non-centered position on said bag since for the particular mower the discharge chute 80, as shown in FIG. 1, is off to the side of the mower housing 81. The bag material 51 is molded and creased 55 in such a manner to make this opening in the correct location for the given mower and holder. Although a bag with a centered hole 56 is potentially utilizable, higher efficiency in filling the bag results from a bag that is matched to the correct mower location.

The shape of the bag is not symmetric; it has a larger back 60 than front. The back 60 of the bag is nearly vertical during filling but sits horizonal on the ground once the bag is filled and set aside. In general the area of front 55, as measured with a vertical plane through seal 57 is about 60–80 percent, preferably 75 percent, of the base or back 60. The bottom 59 is about horizonal during filing while the top 50 slants upward from the smaller front 57 to the larger back 60. This allows better efficiency is filling the bag. If the debris material is quite light, such as dry leaves, more space is required and the lower limit for the front 55, nearer 60 percent, is likely employed in making a bag for such a pickup operation.

The material of various parts of the bag is critical. Because of the disposable nature of the bag, it is constructed of biodegradable plastic with a thickness from about 1–4 mil or 0.001–0.004 inches, preferably about 1-2 mil or 0.001–0.002 inches. The actual determination of what is biodegradable plastic is uncertain, but if identified by the manufacture as such in advertising and on the package, then it is assumed meet appropriate standards, and these are adequate for the subject invention. In an alternate formulation plastic that is not biodegradable is employed; however, then the debris material is normally just stored waiting further use or transfer.

Figure 3A:
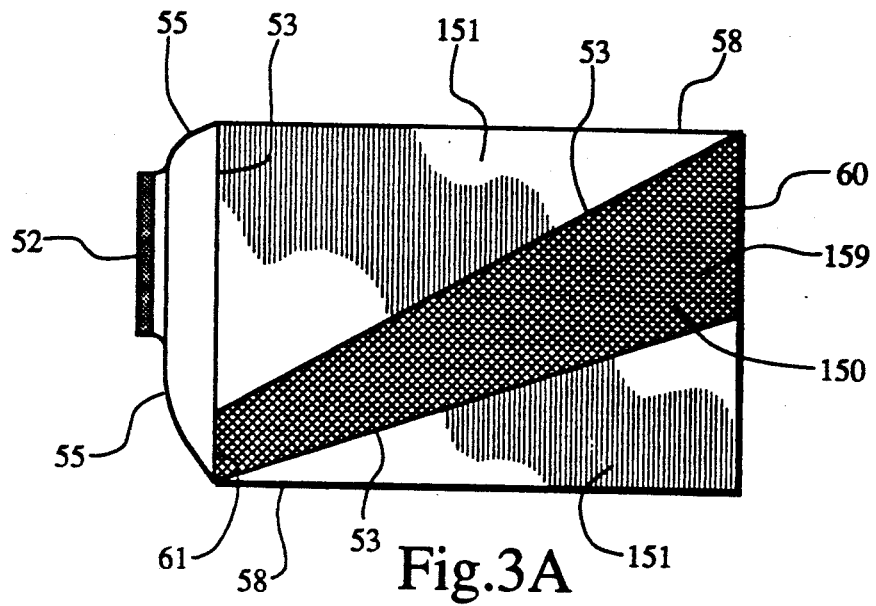
FIG. 3A shows top view of alternate bag design.

The bag is constructed with all seals or seams 53 sealed together by local melting with a hot surface or heat sealing; however, alternate fastening is potentially employed such as sewing, buttoning, or stapling. In order to retain high efficiency in filling the bag, the balance between aerated or mesh plastic and solid or film plastic is important. In one design the two sides 58 and the top 50 are plastic mesh 150 allowing air to pass readily. To do this the plastic mesh 150 is approximately 30–70, preferably about 50, percent voids with small holes approximately 10–30, preferably about 20, per inch. FIGS. 2A and 2B show this type of bag. FIG. 3A shows an alternate bag design whereby the bag is constructed of solid plastic 151 except for the top 50 which has a diagonal-like plastic mesh 150 strip 159. This strip 159 covers approximately 30–70, preferably about 50, percent of the back 60 to top 50 seal 53 while it covers only approximately 15–30, preferably about 20, percent of the front 55 to top 50 seal 61. The particular shape of the strip 159 allows high efficiency filling. For this application the plastic mesh 150 making up the strip 159 is likely closer to the upper limit of 70 percent voids. Again for convenience all seals 53 whether with plastic film or plastic mesh are heat seals.

Figure 3B:
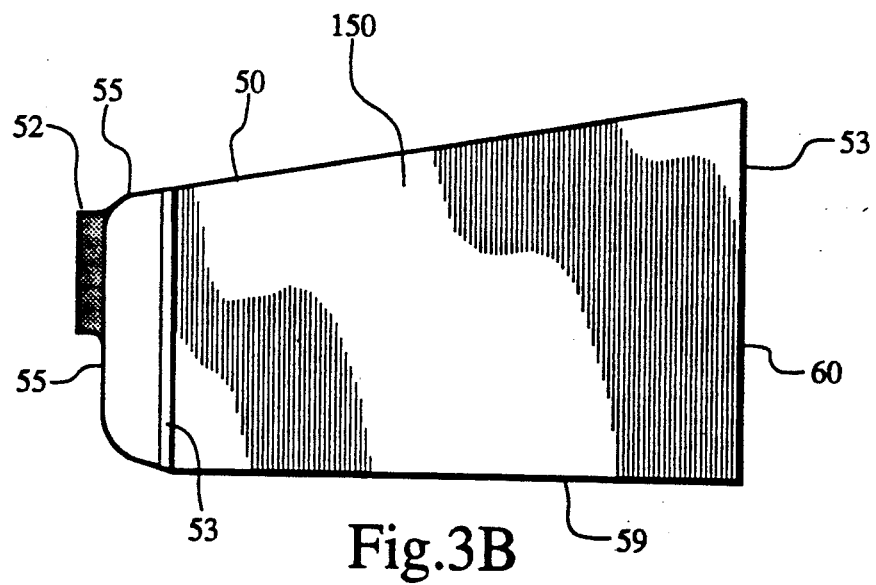
FIG. 3B shows side view of alternate bag design.

The side-length of the bag as noted by the bottom 59 length, as shown in FIG. 3B, is not critical; however, the trade-offs represent how much debris the bag can hold as well as the potential shortening of the bag, as explained below, if the blower capacity of the mower is in adequate. A good trade-off is to make an approximately 16 to 24, preferably 20, gallon bag. This is large enough to hold a reasonable amount of debris when packed with good efficiency as this invention performs, yet small enough so as well handled even by a person of small stature. For the preferred embodiment the bag is, in inches, 12×16 in front 55 along seal 61, 16×16 in back 60, with a bottom length 59 of 24 and contains approximately 20 gallons of debris.

In order to match the bag design with a given mower it is necessary to check out the air blowing capacity of the mower. This may vary with the category of mower and the type and dryness of the lawn and leaf debris. Thus if the bag is not filling properly with the diagonal strip design of FIG. 3A, switch to the FIGS. 2A and 2B type bag. If this still is in adequate change the blade on the mower to a design that blows more air. For instance, U.S. Pat. No. 3,574,272 shows a blade design for a larger amount of blown air, and the specification of this patent is hereby incorporated by reference. Finally if these steps are unsuccessful, shorten the length of the bag design and repeat the above steps again.

FIG. 4 shows the support or holder 80 unmounted whereas FIG. 1 has it attached to the mower. It is built slight larger than the bag, such as 0.5-2 inches all around, preferably about 1 inch, and of a mesh-type light structural material. However if the support is excessively larger than the bag, high stress is potentially placed upon the bag seams causing failure under some circumstances. Routine bag seams splitting might mean that the clearance between the support and the bag needs reducing. The support material is not critical except that it must have sufficient structural integrity for appropriately rigidity; further, it is solid enough not to pass any significant rocks or other missiles that are thrown by the mower blade. Such material as metal mesh, expanded metal, metal lathe, and structural plastic mesh is likely employed that would pass less than about ¼ inch missiles. The front 71 of the holder 80 is a solid piece of material, preferably steel, strong enough to mount firmly to the mower surface 82 that is flush to the debris exhausting chute. Said mounting is by any convenient method such as bolting, hooking, sliding, clamping, clasping, latching and combinations thereof. The other end of the holder 73 is held up by two hooks 72 or other means that fit over the mower handle 83 near its top. The bottom 74 of the holder 80 is positioned nearly horizontal slightly above the ground level by adjusting the length of the hooks 72. If the ground is rough, slightly more clearance is likely utilized.

The holder 80 has a part 75 that raises by a handle 77 and the this movement is by hinges 76 or other means.

This hinged section 75 is used to remove a filled bag and place a new one in the proper position for filling with the elastic band 52 around the discharge chute extender 70 which is attached to the front 71 of the holder 80. Said extender is reasonably matched to the mower discharge chute so that debris does not fall between. It is important that the location of the hinged section is such that it is opened into the mower handle opening below the brace 78; thus, the width of the holder is such as to fit this width between the mower handles 79. So for a particular mower the front of the holder and the front of the bag is likely less than this measurement between mower handles. Alternatively the hinged section is made less than the full width of the holder if necessary to fit between the mower handles.

EXAMPLE 1

For demonstration and check out purposes a standard John Deere mower, 3 horse power, 21 inch cut model only modified to allow the bolting of the bag container to the rear of the mower housing as shown in FIG. 1, was employed. Ordinary plastic film was used that was not marked biodegradable but was obtained from a cutup 1.01 mil Hefty Trash Bag manufactured by Mobil Chemical Company.

The plastic mesh was 1-2 mil in thickness and contained about 20 holes per inch in both directions; however, any plastic biodegradable mesh with approximately 30-70 percent voids and having 10-30 holes per inch is potentially usable. The plastic mesh or screen was originally made for use as screening material and manufactured by Phifer Wire Products. A similar material, often in the form of a course plastic weave, was made for use with gardens so as to slow the growth of plants but allow air and water to pass; Dalen Products, Reemay Manufacturing and DeWitt Company made this weave-type mesh. Alternatively this plastic mesh can be made by pressing the required size and density of holes in plastic film.

The oval entrance opening, with an elastic band folded into it, was about 5×7 inches which fitted conveniently over the holder's extension to the debris chute of the mower. The front was 12×16 and the back 16×16 inches with a length of 34 inches. The diagonal top design of FIG. 3A was employed with the diagonal plastic mesh strip 8 inches on the back and 4 inches on the front running with the 4-inch part on the front side away from the bag entrance.

The holder was made of aluminum metal mesh having voids that would pass about ¼ to ½ inch, preferably ¼ inch, in diameter material and was bolted onto the mower frame using a steel plate of nominal ⅛ inch thickness. The top part of the holder was hinged to fit between the mower handles and in front of the cross-support bar of the mower handle.

The unit was tried with ordinary grass normally handled well by the mower with no catcher. The grass did not fill well into the bag. To remedy the situation a new similar bag was made only 24 inches in length. This worked satisfactory and the bag filled easily to a good fullness and set firmly on the ground when filled.

EXAMPLE 2

The mower and other conditions of Example 1 were employed except that the bag design of FIG. 3B was employed using a 24 inch length bag wherein the two sides and top were made of plastic mesh. When tried, this filled even more evenly and is employed in taller or wetter grass or with the mower engine speed not a maximum.

EXAMPLE 3

The mower and conditions of Example 1 are employed with the 34 inch bag except that the mower blade is replaced with one designed to blow considerably more air, such as a 50 percent increase. Now the larger bag did fill properly but is more difficult to handle getting out of the holder since it contains approximately 30 gallons of debris. Further to accommodate more air it is potentially advisable to make the mesh have a higher void content; that is, instead of 20 holes per inch, 25-30 holes per inch may perform better.

The foregoing description of the specific embodiments will so fully reveal the general nature of the invention that others can, by applying current knowledge, readily modify and/or adapt for various applications such specific embodiments without departing from the generic concept, and therefore such adaptations or modifications are intended to be comprehended within the meaning and range of equivalents of the disclosed embodiments. It is to be understood that the phraseology or terminology herein is for the purpose of description and not of limitation.

I claim:

1. Apparatus for effectively containing leaf and lawn debris as an accessory to a power mower with chute comprising:
   a bag with seals made from plastic film and plastic mesh, selected from film of 30-70 percent voids formed from holes spaced 10-30 per inch, weave of 30-70 percent voids, and combinations thereof, wherein said seals are selected from the group consisting of heat sealing, sewing, buttoning, stapling and combinations thereof;
   means for positioning said mesh to effectively fill said bag with said debris;
   a support for said bag made from structural large mesh material forming an enclosure for said bag with an upper hinged section for bag transfer wherein attaching said support firmly to said chute is selected from the group consisting of bolting, hooking, sliding, clamping, clasping, latching and combinations thereof; and
   holding said bag onto said support with an elastic band to catch said debris and seal said bag when removed.

2. The apparatus of claim 1 wherein all plastic further comprises being biodegradable.

3. The apparatus of claim 1 wherein all plastic further comprises a thickness of approximately 1-4 mil.

4. The apparatus of claim 1 wherein said bag further comprises a size composed of dimensions fitting behind the mower and below the mower handles.

5. The apparatus of claim 4 wherein said size further comprises a volume of about 16-24 gallons.

6. The apparatus of claim 5 wherein said volume consists essentially of about 20 gallons.

7. The apparatus of claim 1 wherein said means for positioning said mesh to effectively fill said bag with said debris further comprises said bag being composed of plastic film whose top contains a diagonal strip of plastic mesh that narrows from the back toward the front and which is positioned away from said debris entrance.

8. The apparatus of claim 7 wherein said diagonal strip consists essentially of running from about one-half of the back to about one-fourth of the front on the top of said bag.

9. The apparatus of claim 1 wherein said means for positioning said mesh to effectively fill said bag with said debris further comprises said bag being composed of plastic mesh on the top and both sides with the remainder consisting of plastic film.

10. The apparatus of claim 1 wherein said structural large mesh material further comprises being selected from the group consisting of metal mesh, expanded metal, metal lathe, structural plastic mesh, and combinations thereof.

11. The apparatus of claim 1 wherein said structural large mesh material further comprises safety by utilizing a mesh that passes objects less than about one-quarter inch in diameter.

12. The apparatus of claim 1 wherein said enclosure further comprises an outer size approximately 0.5-2 inches larger all around said bag.

13. The apparatus of claim 1 wherein said support further comprises means for hanging from the handle of the mower to provide approximately a horizontally situated support.

14. The apparatus of claim 1 wherein said means for positioning said mesh to effectively fill said bag with said debris further comprises changing the mower blade to provide a changed air flow through said chute.

15. Apparatus for effectively containing leaf and lawn debris as an accessory to a power mower with chute comprising: a bag, whose size fits behind the mower and below the mower handles with a volume of about 16-24 gallons, with seals made from biodegradable plastic film of about 1-4 mil thickness and mesh, having approximately 30-70 percent voids with small holes spaced about 10-30 per inch, wherein said seals are seals is selected from the group consisting of heat sealing, sewing, buttoning, stapling and combinations thereof;

means for positioning said mesh to effectively fill said bag with said debris;

a bag support having means for hanging from the handle of the mower to provide approximately a horizontally situated position, made from structural mesh material, selected from the group consisting of metal mesh, expanded metal, metal lathe, structural plastic mesh, and combinations thereof, and whose mesh provides safety by passing objects less than about one-quarter inch in diameter, forming a bag enclosure, whose outer size is approximately 0.5-2 inches larger said bag, with an upper hinged section for bag transfer wherein attaching said support firmly to said chute side of the mower is selected from the group consisting of bolting, hooking, sliding, clamping, clasping, latching and combinations thereof;

holding said bag into said support with an elastic band to catch the debris and seal said bag when removed.

16. The apparatus of claim 15 wherein said means for positioning said mesh to effectively fill said bag with the debris further comprises said bag being composed of plastic film whose top contains a diagonal plastic mesh strip, running from about one-half of the back to about one-fourth of the front, which is positioned away from the debris entrance.

17. The apparatus of claim 15 wherein said means for positioning said mesh to effectively fill said bag with the debris further comprises said bag being composed of plastic mesh on the top and both sides with the remainder composed of plastic film.

* * * * *